ns Patent Office 3,641,178
Patented Feb. 8, 1972

3,641,178
PROCESS FOR ALKYLATING AROMATIC COMPOUNDS
Henricus Gerardus Josef Overmars, Zeist, Aris van Elven, Utrecht, and Jan Gerrit Noltes, Bunnik, Netherlands, assignors to International Lead Zinc Research Organization, Inc., New York, N.Y.
No Drawing. Filed Nov. 13, 1969, Ser. No. 876,584
Claims priority, application Netherlands, Dec. 6, 1968, 6817580
Int. Cl. C07c 3/56
U.S. Cl. 260—671 P     10 Claims

ABSTRACT OF THE DISCLOSURE

This disclosure is concerned with a process for alkylating aromatic compounds in the presence of an unsupported catalyst having at least 2 mols of a titanium tetrahalide per mol of a diorganozinc compound.

---

It is known to alkylate aromatic compounds by a Friedel Crafts reaction in the presence of a catalyst such as Lewis acids, i.e., $AlCl_3$, $FeCl_3$, etc. Further, it is known to make an alkylating catalyst from a metal alkyl compound and a metal halide supported on a solid carrier, such as alumina (U.S. 3,031,514). The latter catalyst shows a wide range of activities, such as alkylation, isomerization, disproportionation and polymerization of unsaturated hydrocarbons. This leads to the formation of by-products simultaneously with the alkylation process. In certain instances, however, the substantial formation of these by-products is undesirable.

It has now been discovered that the alkylated aromatic compounds can be provided with little or no side reactions by using an alkylating catalyst which does not show such a wide range of activities. Thus in accordance with one embodiment of this invention, an aromatic compound is reacted with an alkylating agent in the presence of a certain catalyst but in the absence of a solid carrier as a support for the catalyst.

Any aromatic compound which is capable of being alkylated is suitable for this invention. These aromatic compounds are generally liquid hydrocarbons having a replaceable nuclear hydrogen. This includes, among others, the following:

| | |
|---|---|
| benzene | 1,3,5-trimethylbenzene |
| toluene | 1,2,4-trimethylbenzene |
| o-xylene | 1,2,3-trimethylbenzene |
| m-xylene | ethylbenzene |
| p-xylene | t-amylbenzene |
| cumene | dodecylbenzene |

It is also feasible to alkylate a mixture of aromatic compounds.

The alkylating agents in this invention are certain alkenes or alkyl halogenides. An alkene, if employed, must have at least 3 carbon atoms, e.g., 3 to 18 carbon atoms, since ethylene is not satisfactory for the present invention. The alkenes can be straight or branched chained and acyclic or cyclic olefins, diolefins or thiolefins and the following, among others, are suitable:

| | |
|---|---|
| propylene | 4-methyl heptene-1 |
| 1-butene | 5-methyl hexene-1 |
| 2-butene | 5-methyl heptene-1 |
| isobutene | 3-ethyl butene-1 |
| 1-pentene | 3-ethyl pentene-1 |
| 2-hexene | 4-ethyl hexene-1 |
| cyclohexene | 3,3-dimethyl butene-1 |
| 1-octene | 3,3-dimethyl pentene-1 |
| 1-decene | 3,4-dimethyl pentene-1 |
| octadecene | butadiene |
| 2,3-dimethyl butene-2 | isoprene |
| 3-methyl butene-1 | 1,5-octadiene |
| 3-methyl pentene-1 | 1,5,9-dodecatriene |
| 3-methyl hexene-1 | styrene |
| 3-methyl heptene-1 | alpha-methylstyrene |
| 4-methyl pentene-1 | allyl cyclopentane |
| 4-methyl hexene-1 | vinyl cyclohexane |

Suitable alkyl halogenides, when employed, are those containing a $C_2$ to $C_{30}$ alkyl group, and wherein the halogen atom is chloro, bromo or iodo. Compounds within this group include, among others, the following:

| | |
|---|---|
| ethyl chloride | t-butyl bromide |
| n-butyl chloride | isopropyl bromide |
| n-propyl chloride | n-propyl iodide |
| isopropyl chloride | isopropyl iodide |
| t-butyl chloride | partly halogenated paraffin |
| 2-ethylhexyl chloride | |

The alkylating agent can also be a mixture of any of the alkenes and alkyl halogenides set forth above. The mol ratio of the aromatic compound to alkylating agent is generally from about 10:1 to 1:1 and depends on the nature of the desired end products. An excess of aromatic compound is conducive to monosubstitution.

The catalyst combination is a mixture of a diorganozinc compound ($R_2Zn$) and titanium tetrachloride ($TiCl_4$) or titanium tetrabromide ($TiBr_4$). It is critical to use both compounds in this invention since the results are not satisfactory if either the aforementioned zinc compound or halide compound is used alone. Furthermore, inferior results are obtained if an organozinc halide compound (RZnX) is substituted for the diorganozinc compound in the aforementioned mixture.

The diorganozinc compound for the present invention has the following generic structure:

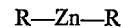

wherein each R is independently selected from an organic (aliphatic or aromatic) group having from 1 to 18 carbon atoms. The aliphatic group may be branched or unbranched and the aromatic group may be condensed or uncondensed and substituted or unsubstituted. The following compounds are suitable, among others:

| | |
|---|---|
| diethyl zinc | diphenyl zinc |
| dibutyl zinc | ditolyl zinc |
| dihexyl zinc | dinaphthyl zinc |

In this invention, titanium tetrachloride is usually used as the other compound in the catalyst combination. However, titanim tetrabromide can also be used. Other titanium halides, such as, titanium trichloride and titanium tribromide are not satisfactory. The molar quantity of titanium tetrachloride can be from about 2 to 6 times the molar quantity of $R_2Zn$. The yield is not sufficient if 1 mol titanium tetrachloride is employed with 1 mol $R_2Zn$. Higher amounts than 6 mols titanium tetrachloride with 1 mol $R_2Zn$ may be used, but are uneconomical and unnecessary. Generally about 0.1 to 7.0 mols of titanium tetrachloride are used per 100 mols of alkylated product to be expected.

The catalyst combination of titanium tetrachloride and $R_2Zn$ may be formed by any satisfactory method. A solvent that is inert to these compounds, is frequently employed, such as hexane or a petroleum fraction. In fact, the aromatic compound to be alkylated may be used as the only solvent. In general, the alkylation can be conducted over a wide temperature range, e.g., about 10° C. to 100° C. The reaction can be initiated at room temperature or lower and the temperature rises since it is mostly exothermic. However, the reaction can also be initiated at a higher temperature, e.g., 50° or 100° C. The upper temperature limit is determined by the boiling point of the lowest-boiling component in the reaction mixture which is dependent upon the pressure employed in the reaction mixture. The pressure can also vary over a wide range including, without limitation, atmospheric pressure and superatmospheric pressure in an autoclave. Generally, the components can be added to the reaction vessel in any order and the alkylated aromatic end product can be recovered by an appropriate procedure.

An important feature in the present invention is that the catalyst is unsupported, i.e., without a solid carrier as a support.

Thus in accordance with this invention, an alkylated aromatic compound is provided without the extensive formation of isomers and polymers. The uses of these compounds are known in the art. For instance, the reaction product of benzene and propylene is an intermediate in the preparation of phenol and acetone (cumene process). The dialkylation product of p-xylene and propylene can be oxidized to pyromellitic anhydride, which is a basic material for certain thermostable polymers. The monoalkylation product of m-xylene and propylene, 1,3-dimethyl-2-isopropylbenzene, can be used as an intermediate in the preparation of 2,6-dimethylphenol, which is the raw material for poly-2,6-dimethylphenylene oxide.

The following examples are submitted to illustrate but not to limit this invention. Unless otherwise indicated, all parts and percentages in the specification and claims are based upon weight.

EXAMPLE I

Diethyl zinc (0.01 mol) and titanium tetrachloride (0.02 mol) were dissolved with stirring in 6.4 mols dry benzene with oxygen and water being excluded to form a dark colored precipitate. After 30 minutes' stirring, the temperature was raised to 70° C. and 1 mol propylene gas was then introduced. The reaction mixture was next washed with 4 N HCl and water to remove the catalyst. After distilling off the excess of benzene, the residue was analyzed by gas chromatography. The degree of alkylation was 89.2% with 71% of the propylene being converted into isopropyl benzene, 17.2% into diisopropyl benzene and 1% into triisopropyl benzene.

This example demonstrates that an alkylated aromatic compound can be provided without substantial isomerization and polymerization.

EXAMPLE II

Into 16 cc. m-xylene, 246 mg. diphenyl zinc and 428 mg. titanium tetrachloride were dissolved with stirring and with oxygen and water being excluded with the mol ratio for the catalyst being 1:2. At about 70° C., 18.9 g. propylene was added dropwise to the reaction mixture by means of a carbon dioxide-acetone cooler. After treating the reaction mixture as described in Example I, the residue was analyzed. The results were: 20% of the m-xylene was converted into dimethylisopropyl benzene in which 80.6% was the 1,3-dimethyl-4-isopropyl benzene; 63% of the m-xylene was converted into the dimethyl-diisopropyl benzene in which 76.7% was 1,3-dimethyl-4,6-diisopropyl benzene; and 3.7% of the m-xylene was converted into dimethyl-tri-isopropyl benzene in which 86.8% was the 1,3-dimethyl-2,4,6-triisopropyl benzene.

EXAMPLE III

Diethyl zinc (111 mg.) was dissolved in 22 cc. p-xylene as described in Example I. Thereafter titanium tetrachloride (340 mg.) was added. The mol ratio for the catalyst was 1:2. At 80–90° C. 17.3 g. propylene gas was introduced. After treating and analyzing as described in Example I, it was found that all p-xylene had been converted with 9.5% as 1,4-dimethyl-2-isopropyl benzene and 90.5% as 1,4-dimethyl-2,5-diisopropyl benzene.

EXAMPLE IV

Diphenylzinc (41 mg.) dissolved in 5 ml. m-xylene and titanium tetrachloride (79 mg.) dissolved in 0.5 ml. hexane were injected in a dry oxygen free stainless steel glass-lined autoclave equipped with a magnetic stirrer. After a half hour stirring, 55 ml. m-xylene were added and propylene gas was pressed into the autoclave up to 9 atmosphere pressure. The ratio of propylene to m-xylene was 1:10 in order to promote the formation of monoalkylation products.

The autoclave was stirred and heated during 5 hours at exactly 50° C. After cooling, the reaction mixture was treated as described in Example I and fractionated. The distillate, boiling from 76–95° C. at 12 mm. vacuum, was analyzed by gas chromatography. It contained 77% monoalkylation products, calculated on the propylene added, consisting of 17% 1,3-dimethyl-2-isopropylbenzene, 73% 1,3-dimethyl-4-isopropylbenzene and 10% 1,3-dimethyl-5-isopropylbenzene. The distillation residue, consisting of dialkylation products, amounted to about 2%.

It is evident from this example, that no substantial isomerization took place because 1,3-dimethyl-2-isopropylbenzene cannot be obtained with conventional alkylation catalysts, unless in very small amounts (<2%), due to product isomerization.

EXAMPLE V

To investigate the amount of product isomerization a mixture of 117 m. mols monoisopropyl-m-xylenes was heated in an inert atmosphere during 5 hrs. at 80° C. in the presence of 1 mol percent diphenylzinc and 2 mol percent titanium tetrachloride in hexane. After treating the reaction mixture as described in Example I, the composition was determined by gas chromatography. The results are shown in Table A.

TABLE A

| Isomer mixture | Wt. percent of isomers | |
| --- | --- | --- |
|  | Before heating | After heating |
| 2-isopropyl-1,3-dimethylbenzene | 16 | 15 |
| 4-isopropyl-1,3-dimethylbenzene | 72 | 73 |
| 5-isopropyl-1,3-dimethylbenzene | 12 | 12 |

This example demonstrates that the catalyst system of 1:2 diphenyl zinc to titanium tetrachloride shows no substantial tendency for product isomerization.

EXAMPLE VI

The procedure of Example IV was repeated using diethylzinc instead of diphenylzinc and running the alkylation for 5 hours at 80° C. In the end product 71% of the propylene was converted to monoalkylation products, consisting of 17% 1,3-dimethyl-2-isopropylbenzene, 73% 1,3-dimethyl-4-isopropylbenzene and 10% 1,3-dimethyl-5-isopropylbenzene.

According to this example it is clear that the diphenyl zinc and titanium tetrachloride catalyst combination has a small isomerization tendency.

EXAMPLE VII

In order to demonstrate the low disproportionation tendency of the catalyst system, a mixture of 21.7 g. phenyldodecane isomers was heated in 46 ml. benzene during 3 hours at reflux temperature in the presence of 1 mol percent diphenylzinc and 2 mol percent titanium tetrachloride. After providing the reaction products as described in Example I, the amount of isomers was determined by gas chromatography. The results are listed in Table B.

TABLE B

| Isomers | Wt. percent of isomers | |
|---|---|---|
| | Before heating | After heating |
| 2-phenyldodecane | 47 | 44 |
| 3-phenyldodecane | 20 | 20 |
| 4,5,6-phenyldodecane | 33 | 36 |

This example shows that no substantial disproportionation took place.

EXAMPLE VIII

The procedure of Example I was repeated but with various molar ratios of diphenyl zinc to titanium tetrachloride for alkylating benzene with propylene. The temperature was 70° C. The reaction time was 2 hours. The molar ratio benzene to propylene was 3.2:1. The results are shown in Table C.

TABLE C

| Mol percent[1] | | Percent absorbed, $C_3H_6$ | Percent reaction product relative to absorbed $C_3H_6$ | |
|---|---|---|---|---|
| Diphenyl zinc | TiCl₄ | | Monosubstitution | Disubstitution |
| 0.5 | 0 | 1.5 | | |
| 0 | 0.5 | 1.5 | | |
| 0.5 | 0.25 | 1.5 | | |
| 0.5 | 0.5 | 1.5 | | |
| 0.75 | 1.0 | 9 | | |
| 0.50 | 1.0 | 100 | 46.6 | 21.6 |
| 0.25 | 1.0 | 50 | 28.2 | 5.3 |
| 0.5 | 2.0 | 100 | 45.2 | 21.6 |
| 1.0 | 2.0 | 100 | 45.6 | 22.5 |

[1] The quantity of catalyst is calculated on the quantity of propylene.

The procedure was repeated substituting diethyl zinc for diphenyl zinc. The results were comparable.

This example demonstrates that it is critical to use a combination of diorganozinc compound and titanium tetrachloride since the use of either one alone did not provide an alkylated aromatic reaction product. This example also demonstrates that it is critical to have a molar ratio of at least 2 for the titanium tetrachloride to the diorganozinc compound in order to form the aforementioned reaction product.

EXAMPLE IX

Example I was repeated with various molar ratios of benzene to propylene with a catalyst combination of 1% titanium tetrachloride and 0.5% diphenyl zinc based on propylene. The temperature was 70° C. The reaction time was 2 to 2½ hours. Table D shows the results.

TABLE D

| Molar ratio | | Percent absorbed, $C_3H_6$ | Yield, mono[1] | Ratio by weight | |
|---|---|---|---|---|---|
| Benzene | Propylene | | | Isopropyl benzene | Diisopropyl benzene |
| 3.2 | 1 | 100 | 46.6 | 3.2 | 1 |
| 4.8 | 1 | 96 | 52.5 | 5.4 | 1 |
| 6.4 | 1 | 100 | 57.8 | 6.3 | 1 |
| 9.3 | 1 | 80 | 41.4 | 9.1 | 1 |

[1] Isopropyl benzene.

The procedure was repeated with diethyl zinc and titanium tetrachloride (1 mol percent:2 mol percent) with a molar ratio of benzene to propylene of 6.4:1. This resulted in 100% of the propylene being absorbed and 71% of the end product was isopropyl benzene.

According to this example, it is preferred to use a ratio of aromatic compound to alkylating agent of between 8:1 and 10:1 when mainly monosubstitution is wanted.

EXAMPLE X

Benzene, toluene, m-xylene and p-xylene were alkylated with propylene in accordance with the procedure described in Example I.

Alkylating benzene with propylene in the presence of diphenyl zinc and titanium tetrachloride at a ratio of 1:2 mol percent provided the following: 58.2% of the benzene reacted to form 32% isopropyl benzene, 30% ortho-, meta- and para-diisopropyl benzene and 38% three isomeric triisopropyl benzenes.

Alkylating toluene with diethyl zinc and titanium tetrachloride at a ratio of 0.25:0.50 mol percent, caused 90.5% of the toluene to be reacted. About 20% methyldiisopropyl benzene and 80% methyl-triisopropyl benzene were obtained.

The procedure was repeated with m-xylene and a catalyst containing diphenyl zinc and titanium tetrachloride at a ratio of 0.25:0.5 mol percent and 86.7% of the m-xylene was alkylated. The product consisted of 23% monoalkylation product (80% being 1,3-dimethyl-4-isopropyl benzene) and 72.5% dialkylation product (76.7% being 1,3-dimethyl-4,6-diisopropyl benzene) and 2.5% trialkylation product. The total yield of 1,3-dimethyl-4,6-diisopropyl benzene relative to m-xylene was 48%.

The procedure was also repeated, alkylating p-xylene with propylene at a temperature of 80–90° C. with a reaction time of 1.5 hours. The results are indicated in Table E.

TABLE E

| R₂Zn | Mol percent | | Mol ratio | | Percent alkylated xylene | Percentage reacting to— | | Percentage total yield of 1,4-dimethyl-2,5-diisopropyl benzene |
|---|---|---|---|---|---|---|---|---|
| | R₂Zn | TiCl₄ | p-Xylene | Propylene | | Mono[1] | Di[2] | |
| Diphenyl | 0.25 | 0.50 | 1 | 2 | 80 | 20 | 80 | 62 |
| Diethyl | 0.5 | 1.0 | 1 | 4 | 100 | 9.5 | 91.5 | 90 |
| Do | 0.25 | 0.5 | 1 | 4 | 63 | 42.5 | 57.5 | 34.5 |
| Do | 0.25 | 1.0 | 1 | 4 | 76 | 28 | 72 | 52 |
| Do | 0.125 | 1.0 | 1 | 4 | 20 | 74 | 26 | 5 |

[1] Monosubstituted.
[2] Disubstituted.

The procedure was repeated by alkylating benzene with ethylene, 1-butene, 2-butene, isobutene, 1-octene and butadiene. Satisfactory results were obtained with all these alkylated agents except ethylene since a high density linear polymer was obtained with a melting point of about 125° C.

EXAMPLE XI

The procedure of Example I was repeated to react benzene with 1-octadecene at a mol ratio of 10:1. The catalyst was diethyl zinc and titanium tetrachloride. The temperature was about 100° C. and the reaction time was 3 hours. The results are listed in Table F.

TABLE F

| Conc. in mol (percent)[1] | | Octadecene, percent which reacted | Isomer composition | | | |
|---|---|---|---|---|---|---|
| Et$_2$Zn | TiCl$_4$ | | 2-phenyl | 3-phenyl | 4-phenyl | 5+6-phenyl |
| 0.6 | 2 | 49 | 41.6 | 20.2 | 10.7 | 27.6 |
| 1 | 2 | 64 | 41.9 | 17.0 | 10.1 | 31.2 |
| 1 | 4 | 55 | 38.8 | 19.3 | 11.4 | 30.7 |
| 2 | 4 | 100 | 36.2 | 18.8 | 11.3 | 33.8 |

[1] Calculated on octadecene.

Similar results were also obtained by repeating the procedure with diphenyl zinc instead of diethyl zinc.

This example shows that satisfactory results were obtained by alkylating with a long-chain olefin using proper catalyst concentrations.

EXAMPLE XII

Benzene was also alkylated with various alkyl halogenides by following the procedure of Example I. Both diphenyl zinc and diethyl zinc were used as the organozinc compound. The ratio of benzene to alkyl halogenide was 4:1. The ratio of catalyst R$_2$Zn to titanium tetrachloride was 1 mol percent:2 mol percent based on benzene. The temperature was 80° C. Table G lists the satisfactory results.

TABLE G

| Alkyl halogenide | Diphenyl zinc plus TiCl$_4$ | | | Diethyl zinc plus TiCl$_4$ | | |
|---|---|---|---|---|---|---|
| | Reaction time in hours | Mono | Di | Reaction time in hours | Mono[1] | Di[2] |
| Isopropyl chloride | 6 | 23.5 | 1.6 | 5 | 52 | 17 |
| Tertiary butyl chloride | 0.5 | 54 | 28.5 | 0.5 | 82 | 4 |

[1] Monosubstituted.
[2] Disubstituted.

Comparable satisfactory results were noted when the procedure was repeated with isopropyl bromide and tertiary butyl bromide.

It is manifest from this example that an alkyl halogenide can be used as the alkylating agent in this invention.

EXAMPLE XIII

The procedure of Example VI was repeated except that the diethyl zinc is replaced with ethyl zinc chloride. The results are as follows: the alkylation degree was 43% and the reaction product contained 90% monoalkylation and 10% dialkylation products.

Examples VI and XIII show the superiority of using a diorgano zinc compound rather than an organo zinc halide compound in combination with titanium tetrachloride.

EXAMPLE XIV

The procedure of Example I was repeated except that the titanium tetrachloride was replaced independently with titanium trichloride. No alkylation was obtained.

Comparing Examples I and XIV it is apparent that superior results are achieved if the diorgano zinc compound is used with titanium tetrachloride rather than with titanium trichloride.

EXAMPLE XV

The procedure of Example IV was repeated using diethyl zinc (0.5 mol percent) and titanium tetrabromide (1.0 mol percent). The reaction mixture was held at 80° C. during 5 hours and 59% of the propylene was converted to monoalkylation products.

A gas chromatographic analysis of the distillate showed the presence of about 9% 1,3-dimethyl-2-isopropylbenzene, 77% 1,3-dimethyl-4-iso-propylbenzene and 14% 1,3-dimethyl-5-iso-propylbenzene. The distillation residue amounts to about 2%.

This example demonstrates satisfactory results when titanium tetrabromide is employed in the catalyst.

Having set forth the general nature and specific embodiments of the present invention, the true scope is now particularly pointed out in the appended claims.

What is claimed is:

1. A process which comprises alkylating an aromatic compound with an alkylating agent selected from the group consisting of an alkene having at least 3 carbon atoms and an alkyl halogenide wherein the alkyl group has 2 to 30 carbon atoms and the halo group is chloro, bromo or iodo in the presence of an unsupported catalyst; said catalyst consisting of (A) titanium tetrachloride or titanium tetrabromide and (B) a diorgano compound having the structure:

R—Zn—R wherein each R is independently selected from a hydrocarbon group having 1 to 18 carbon atoms; said catalyst having a mol ratio of $A:B$ of at least 2:1.

2. The process according to claim 1 in which the alkylating agent is an alkene.

3. The process according to claim 1 in which the alkylating agent is an alkyl halogenide.

4. The process according to claim 1 in which the catalyst contains titanium tetrachloride.

5. The process according to claim 1 in which the catalyst contains titanium tetrabromide.

6. The process according to claim 1 in which the catalyst contains diethyl zinc.

7. The process according to claim 1 in which the catalyst contains diphenyl zinc.

8. The process according to claim 1 in which the alkylating agent is selected from the group consisting of propylene, 1-butene, 2-butene, isobutene, 1-octene, 1-octadecene, isopropyl chloride, isopropyl bromide, tertiary butyl chloride and tertiary butyl bromide.

9. The process according to claim 1 in which the aromatic compound to be alkylated is selected from the group consisting of benzene, m-xylene, p-xylene and toluene.

10. The process according to claim 1 in which the alkylation is conducted at a temperature between about 10° C. and 100° C.

References Cited

UNITED STATES PATENTS

| 2,721,189 | 10/1955 | Anderson et al. | 260—671 C |
| 3,031,514 | 4/1962 | Kosmin | 260—671 C |

CURTIS R. DAVIS, Primary Examiner

U.S. Cl. X.R.

260—671 C

20302

PO-1050
(5/69)

UNITED STATES PATENT OFFICE
CERTIFICATE OF CORRECTION

Patent No. __3,641,178__     Dated __February 8, 1972__

Inventor(s) __Henricus Geradus Josef Overmars et al__

It is certified that error appears in the above-identified patent and that said Letters Patent are hereby corrected as shown below:

Column 1, line 61, "thiolefins" should be --triolefins--;

Column 2, line 53, "titanim" should be --titanium--;

Column 7, line 31, Table G, "6" should be --5--.

Signed and sealed this 13th day of June 1972.

(SEAL)
Attest:

EDWARD M. FLETCHER, JR.
Attesting Officer

ROBERT GOTTSCHALK
Commissioner of Patents